(Model.)
L. H. SCOTT.
PEACH PARING MACHINE.
No. 331,451. Patented Dec. 1, 1885.
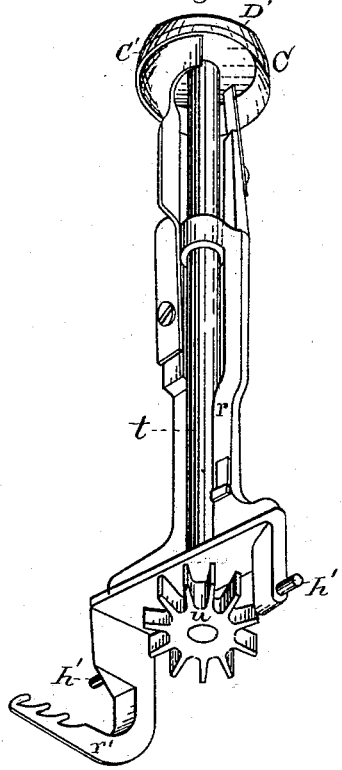
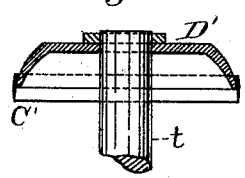
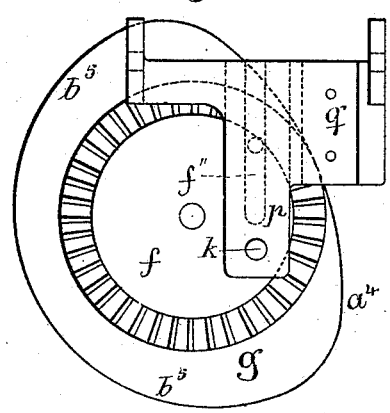
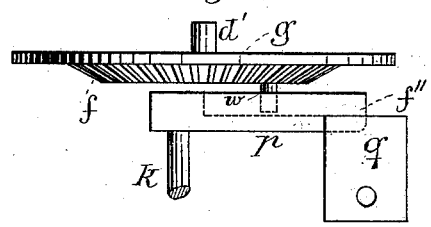
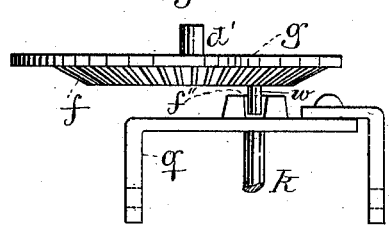
Witnesses:
Gunvald Aas.
Albert Finkelstone
Inventor
Lanphiar H. Scott.
By James H. Whitney
Attorney.

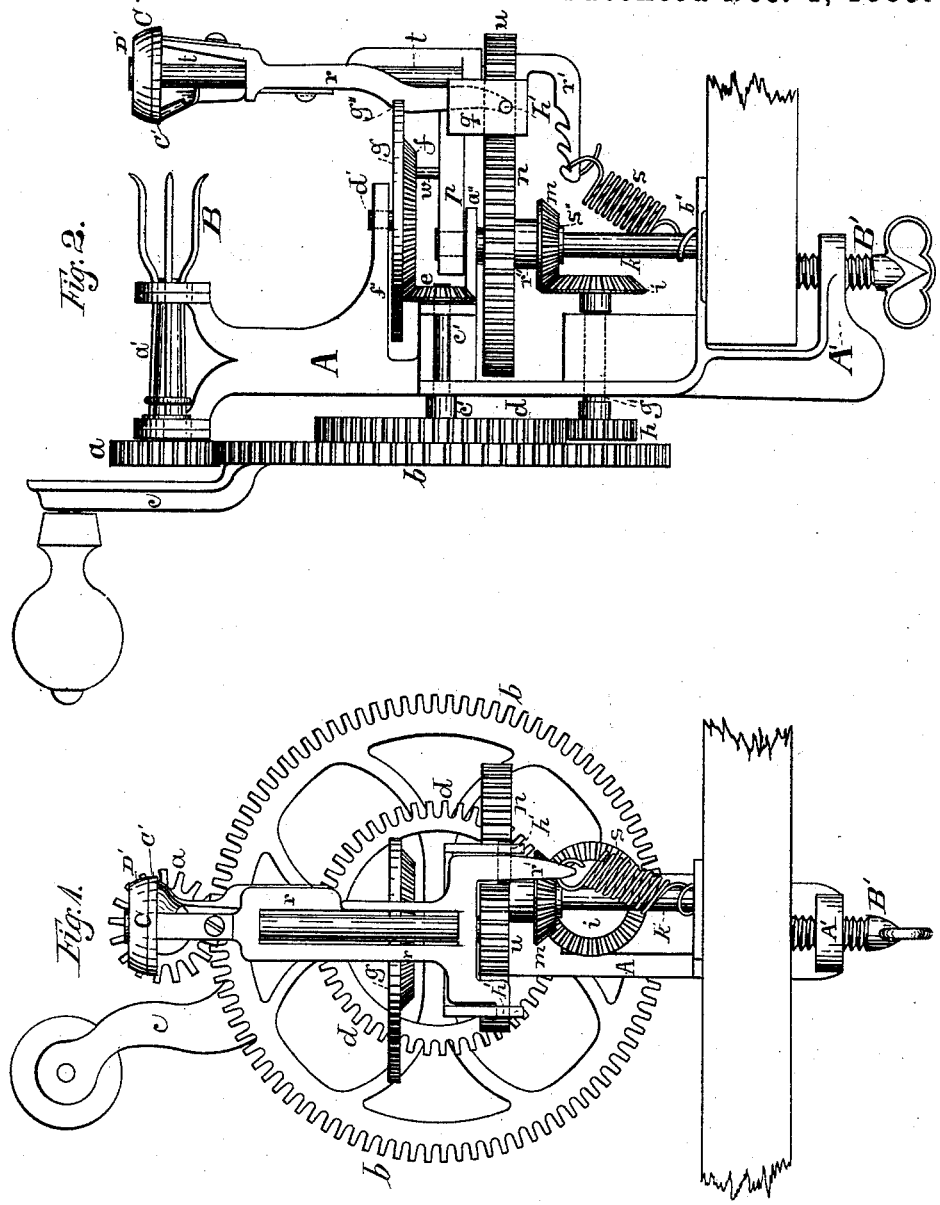

UNITED STATES PATENT OFFICE.

LANPHEAR H. SCOTT, OF NEWARK, NEW JERSEY.

PEACH-PARING MACHINE.

SPECIFICATION forming part of Letters Patent No. 331,451, dated December 1, 1885.

Application filed November 29, 1884. Serial No. 149,194. (Model.)

*To all whom it may concern:*

Be it known that I, LANPHEAR H. SCOTT, of Newark, in the county of Essex and State of New Jersey, have invented certain Improvements in Peach-Paring Apparatus, of which the following is a specification.

This invention relates to that class of machines more particularly designed for paring peaches and like soft fruits, but which by slight and suitable modifications may also be employed for paring apples and the like.

The object of my invention is to provide an apparatus in which the various desiderata of a practically perfect apparatus shall be combined to a higher degree than has heretofore obtained in such mechanism.

My invention comprises certain novel combinations of parts, whereby said object is effectually secured.

Figure 1 is an end view, and Fig. 2 a side view, of an apparatus constructed according to my said invention. Figs. 3 to 7, inclusive, are detail views illustrating various features of my said invention.

A is the standard which supports the various working parts of the apparatus, and which is provided at its lower end with any suitable means—as, for example, a clamp and screw, A' B'—whereby it may be attached to any appropriate fixed support. At or near the upper end of this standard is the fork B, the construction of which may be varied in well-understood ways, according as the apparatus is to be used for paring peaches or apples. The shaft $a'$ of this fork runs in suitable bearings, and is provided with a spur-pinion, $a$, which gears into a spur-wheel, $b$, provided with a crank, $c$, by which the machine is operated. Another spur-wheel, $d$, is attached to the spur-wheel $b$, or to the shaft $c'$ thereof, and rotates on the same axis. The shaft $c'$ of the spur-wheels $b$ and $d$ works in a suitable bearing on the standard A, and has at its opposite or inner end a pinion, $e$. This pinion $e$ gears into a horizontal bevel-gear, $f$, which works on a suspended journal, $d'$, secured to an arm, $f'$, of the standard A.

Attached to the upper side of the bevel-gear $f$, and consequently turning therewith, is a cam-plate, $g$. (More fully shown in the detail plan view, Fig. 5.)

A short shaft, $g'$, working in suitable bearings on the standard A, has at one end a spur-pinion, $h$, which gears into the spur-wheel $d$, and at the other end a bevel-pinion, $i$.

At $k$ is a vertical shaft, which works at top and bottom in suitable bearings provided in horizontal arms $a''$ $b''$ of the standard A, and which has a bevel-pinion, $m$, which gears into the bevel-pinion $i$, and which is also provided with a spur-wheel, $n$. Said bevel-pinion $m$ and spur-wheel $n$ are connected by a sleeve, $r''$, and loose upon the shaft $k$, and is prevented from slipping down thereon by an annular shoulder, $s''$. To the upper end of the shaft $k$ is provided a horizontal arm, $p$, which has at its outer extremity a bracket, $q$. (More fully represented in the side view, Fig. 6, and in the front view, Fig. 7.) Between the two ends of this bracket $q$, by means of pivots $h'$, is a knife-bearing standard, $r$, to the lower end of which is provided an inwardly-curved arm, $r'$, which is connected by means of a spring, $s$, with the shaft $k$ in such manner as to tend to draw downward the arm $r'$, and consequently to throw inward the knife-bearing standard $r$. This standard $r$ is constructed with bearings to carry the shaft $t$ longitudinally therewith, to the upper end of which is made fast the circular knife C, and at the lower end of which is a spur-pinion, $u$, which gears into the spur-wheel $n$, the teeth of the said pinion and spur-wheel being so shaped and proportioned that the pinion will move somewhat loosely with reference to the spur-wheel, in order that the latter may insure the rotation of the said pinion $u$, notwithstanding the swinging of the standard $r$ and shaft $t$ upon the pivot $h'$. The circumference of the cam-plate $g$ bears against the inner side of the standard $r$, as represented, for example, at $g''$ in Fig. 2, so that the said cam-plate during one part of its rotation will swing outward the standard $r$, and consequently the shaft $t$ and the knife C.

In the upper side of the arm $p$ of the shaft $k$ is a longitudinal slot, $f''$. (Represented in Fig. 7, and also indicated in dotted outline in Figs. 5 and 6.) The direction of this slot is of course substantially radial to the axis of the shaft $k$. Projecting downward into this slot from the bevel-gear $f$ is a tooth or stud, $w$.

In the operation of the machine motion is simultaneously transmitted as follows: from the wheel $b$, through the pinion $a$, to the fork B, to rotate the same; from the wheel $b$, through the wheel $d$, bevel-pinion $e$, and bevel-gear $f$, to the cam-plate $g$ and the tooth or stud $w$, the latter being carried around the axis of the said bevel-gear $f$; from the wheel $b$, through the wheel $d$, pinion $h$, bevel-pinions $i$ and $m$, wheel $n$, and pinion $u$, to the shaft $t$, to rotate the knife C. During the one portion of the rotation of the tooth or stud $w$, as hereinafter explained, the action of said tooth or stud $w$ in the slot $f'''$ of the arm $p$ swings the said arm around the axis of the shaft $k$ through the arc of a circle until the tooth or stud, being brought to the inner end of said slot, acts in an opposite direction, and thereby reverses the movement of said arm, and consequently of the standard $r$ and of the knife C. The first-named or outward movement of said standard and knife is that which permits the knife to act, in a manner well understood in the art, upon the fruit held by the fork. During this movement the cam-plate $g$ does not act upon the knife-carrying standard $r$; but when its outward limit is reached, and just before its return movement, the part $a^4$ of said cam-plate (shown in the inverted plan view thereof, Fig. 5) acts upon said knife-carrying standard to swing the same outward, so that in its return motion it will pass through a larger arc than before, and thus keep out of contact with the fruit still held by the fork. It will be observed that while the part $a^4$ swings outward the knife-carrying standard $r$ is kept outward during its return motion, as aforesaid, by means of the semicircular portion of the cam-plate $b^5$, against which said knife-carrying standard bears during its said return movement. When the said knife-carrying standard $r$ is brought back to its first position, the pared fruit is removed from the fork, and the apparatus is ready for repetition of the operation of paring.

The knife C, included in my said invention, is of peculiar construction, and is composed of a circular band or crown-shaped steel cutting portion, C', which should be made of steel, and a portion, D', made, preferably, of cast metal, the part C' being brazed or otherwise suitably attached to the part D'. By this means the knife may be more cheaply constructed, is made much stronger, and is less liable to spring out of shape than is the case with circular knives in which the crown and cutting portion are integral and made of a single piece of sheet metal stamped to shape, it being feasible, moreover, to use a quality of steel for the part C' better adapted for paring apparatus, and is feasible where the material has to be subjected to the action of a stamping-press, as is the case where the cutting part and crown of the knife are stamped out of a single piece of sheet metal.

I am aware that a head or crown piece of sheet metal has heretofore been made, around which is formed a groove, into which is sprung an annular cutter, and do not claim such construction of cutter, broadly, as the frictional contact between the cutter and head has been found not to give entire satisfaction, as at times it permits the slipping and even actual displacement of the cutter. Furthermore, the cutter must necessarily be made of a less length than the distance around its supporting-head, thus leaving a space between its opposite edges, which in operation leaves a portion of the skin remaining on the fruit. Another objection arises in having the small space between the adjacent surfaces of the cutter and head into which the juice of the fruit finds its way, and thus soon corrodes the cutter and renders the same useless, and if the cutter is removed and dried and replaced its tension will soon be destroyed, and it will no longer remain in place. Again, this oft-repeated removal of the cutter for drying purposes subjects the same to repeated accidents, such as breakage, enlargement, or its possible loss.

All the above objections are overcome by my arrangement and construction of parts.

In my former patent, No. 292,592, granted January 29, 1884, a slotted lever is interposed between the knife-carriage and the table or cam-wheel, which actuates said slotted lever during its revolution by a depending pin entering the slot in said lever, the latter of which in turn imparts a reversing motion to the knife and knife-carriage. In the present invention this intermediate slotted lever is dispensed with, thus reducing the expense of manufacture as well as the number of operating parts of the machine.

I am also aware that the knife-carrying carriage has been pivotally and eccentrically supported on a table-wheel, and that said carriage has been provided with an arm projecting through the table-wheel to engage a cam portion of the stock or frame, to carry said knife away from the pared fruit while it is returning to its normal or slanting position.

What I claim as my invention is—

1. In a fruit-paring machine, the combination of the following elements, to wit: a driving spur-wheel, $b$, a horizontal spur-wheel, $n$, a shaft, $k$, gearing connecting said wheel $n$ with the driving-wheel $b$, a pivoted knife-carrying standard, $r$, shaft $t$, gear connecting said shaft $t$ with the spur-wheel $n$, longitudinally-slotted arm $p$ on the shaft $k$, cam-plate $g$, gears for connecting said cam-plate with the driving-wheel $b$, tooth or stud $w$, working in the slot $f'''$ of the arm $p$, and a suitable fruit-holding fork connected by gearing with the driving-wheel $b$, all substantially as and for the purpose herein set forth.

2. In a fruit-paring machine, the combination of a revoluble cam-wheel provided with a depending stud, a knife-supporting plate or carriage journaled on a vertical shaft placed to one side of the axis of the cam-wheel and radially slotted to receive the stud depending from the cam-wheel, a knife-standard pivotally supported by said plate or carriage and adapted to bear on the outer edge of the cam-wheel during its reverse motion, a revoluble knife mounted on said standard, gearing connecting said knife with the vertical shaft to which the knife-plate is journaled, and means, substantially as set forth, to rotate said shaft independently of the cam-wheel, substantially as and for the purposes specified.

LANPHEAR H. SCOTT.

Witnesses:
  WM. H. ELPHINSTONE, Jr.,
  G. K. ELPHINSTONE.